Nov. 7, 1944. R. Q. PARKS 2,362,396
METHOD FOR DETERMINING MOISTURE IN FORAGES AND GRAINS
Filed Dec. 16, 1940 2 Sheets-Sheet 1
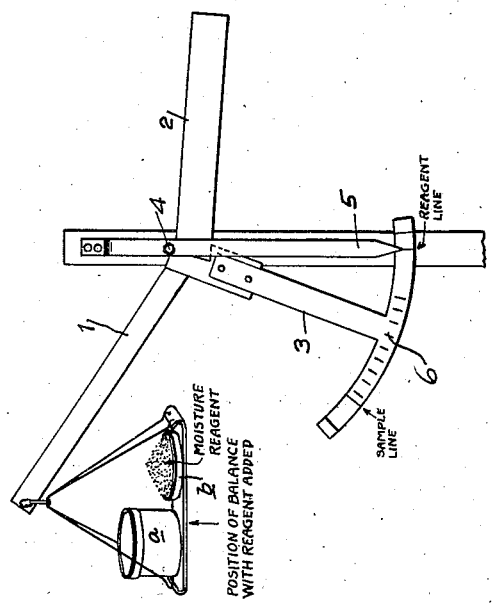
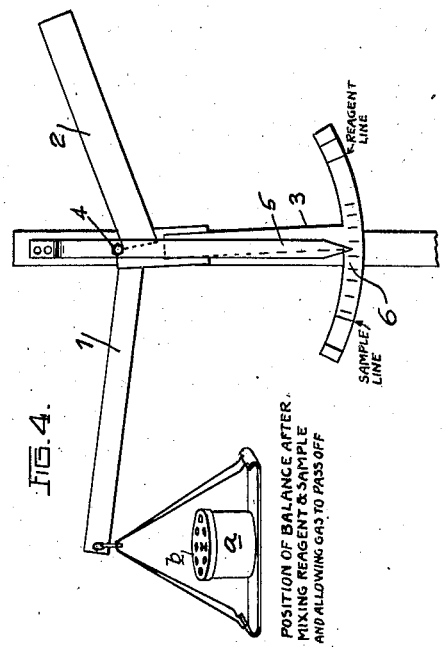
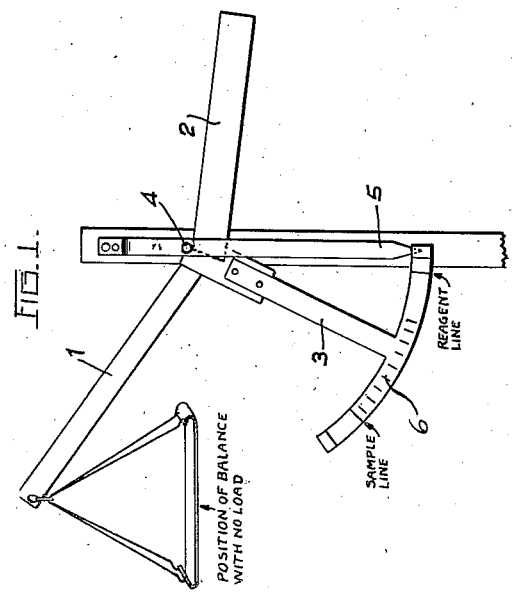
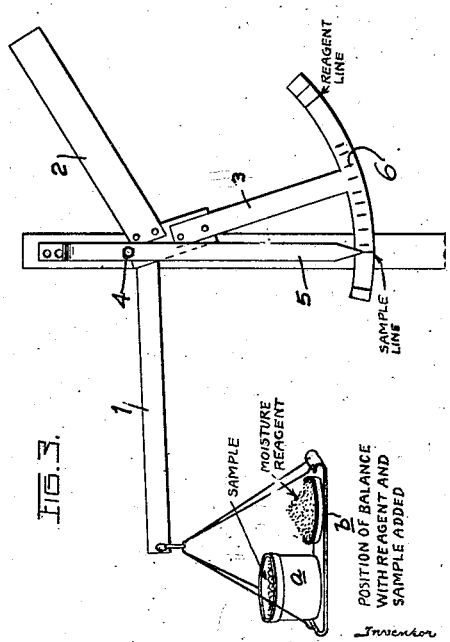
ROBERT QUINN PARKS Nov. 7, 1944. R. Q. PARKS 2,362,396
METHOD FOR DETERMINING MOISTURE IN FORAGES AND GRAINS
Filed Dec. 16, 1940 2 Sheets-Sheet 2
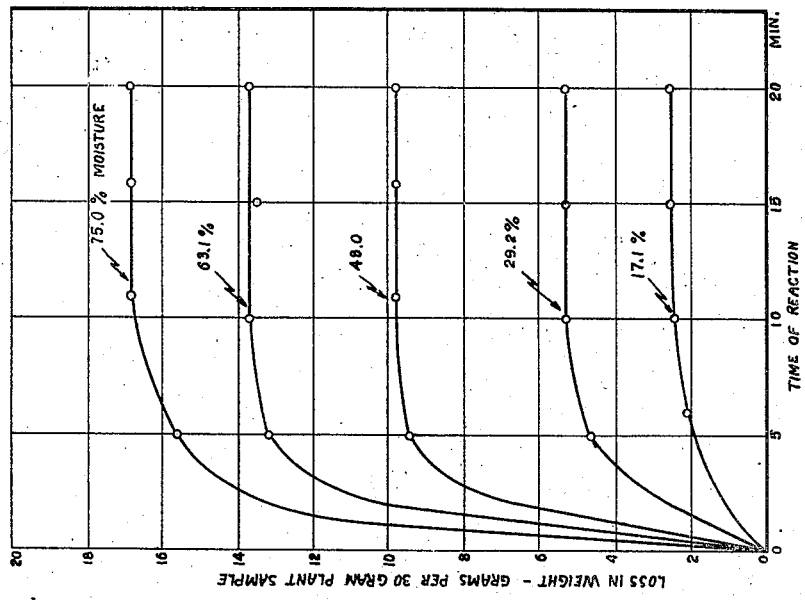
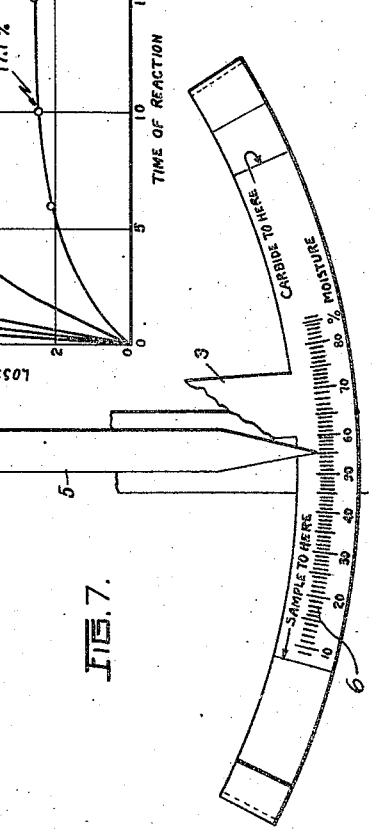
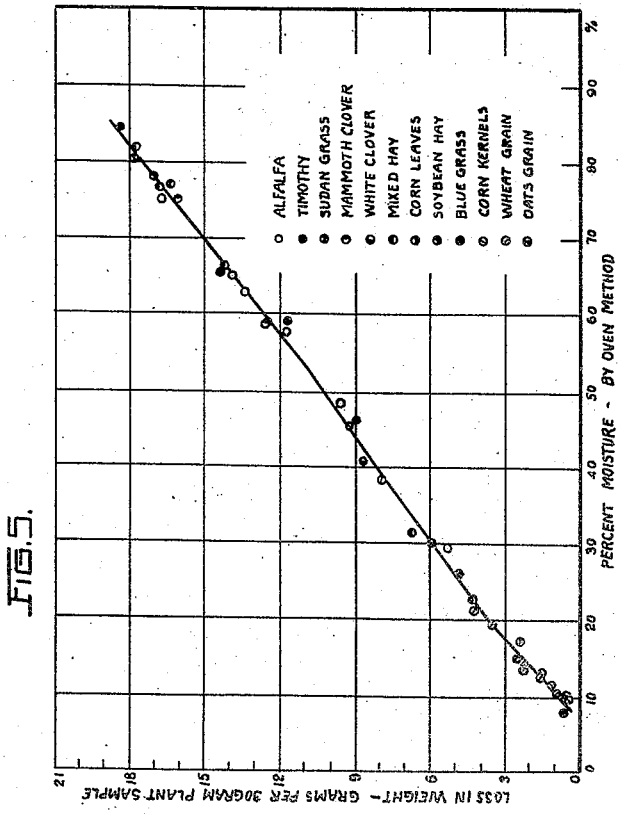
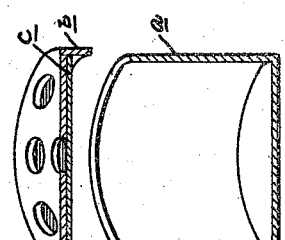
ROBERT QUINN PARKS, Inventor Patented Nov. 7, 1944

2,362,396

UNITED STATES PATENT OFFICE 2,362,396

METHOD FOR DETERMINING MOISTURE IN FORAGES AND GRAINS

Robert Quinn Parks, Columbus, Ohio, assignor to The Ohio State University Research Foundation, Columbus, Ohio, a corporation of Ohio Application December 16, 1940, Serial No. 370,334

1 Claim. (Cl. 23—230)

The present invention relates to the method and apparatus for obtaining moisture determinations in small grains, corn, hay, silage, and forage materials, such as legumes, grasses, and legume-grass mixtures.

Recent advances in agricultural science have intensified the need for a rapid, inexpensive and fairly accurate method for determining percentage of moisture in plant materials. Such a method would be of use not only to investigators of many types of forage and cereal problems, but would also enable the farm operator to conduct more efficiently and economically such operations as putting up silage, making hay, harvesting wheat, cutting or husking corn, etc. To fulfill the need of practical agriculture for moisture control in such operations a method is required which would cover a continuous moisture range of from less than 10 per cent to 85 per cent and which could be applied to both grains and forage materials.

There is at present no widely adaptable method for determining moisture in plant tissues that is both rapid enough for practical use and financially within the reach of the average farmer. The standard method for determining percentage moisture in plant tissues is to measure the loss in weight after heating the material in a hot air oven. The time required varies from two hours to three days, depending on the temperature used and the fineness of subdivision of the sample. Such determinations obviously are not well adapted to practical use on the farm.

The method of determining moisture by distillation with toluene is satisfactory in accuracy, but impractical because of the time and equipment required.

An apparatus which is designed to force heated air through the plant material is now commercially available and is sufficiently rapid and accurate for moisture determinations on forage materials, but involves the use of equipment which the average farmer is either unable or unwilling to purchase.

The Tag-Heppenstahl electric moisture meter is very accurate if the material is of uniform moisture content, but requires expensive equipment and is limited in use to small grains and shelled corn of from 7 per cent to 31 per cent moisture.

Still another method is based upon the rise in temperature which results when plant material is mixed with concentrated sulfuric acid, and is used most successfully in the moisture range of 15 per cent and 50 per cent. However, it will be appreciated that any method which employs acid of this character is suited for use only by laboratory technicians and not by the average farmer.

The primary object of the invention is to provide an inexpensive method and apparatus for the rapid determination of moisture in small grains, corn, hay and silage materials and particularly to provide such an apparatus which an average farmer can readily operate and obtain at least a fairly close approximation of the amount of moisture in his staple materials. This object is obtained in brief, as a result of the discovery that when an excess of calcium carbide is mixed with the sample the loss of weight caused by the reaction bears a direct relationship with respect to the original moisture content of the plant tissue.

The invention will be better understood when reference is made to the following description and the accompanying drawings.

In the drawings:

Figures 1 to 4 represent by diagram, four steps of the improved method and utilizing a specially designed scale for weighing the chemical reaction constituents quite accurately.

Figure 5 is a graph which shows the relationship found between oven determined percentages of moisture and losses in weight of samples of plant materials.

Figure 6 is a view in section of a container or box and its cover for receiving the sample and the reaction material.

Figure 7 is a view of the index and the scale pointer of a weighing device, shown somewhat larger than in the other figures and employed in making the moisture determinations.

Figure 8 shows some of the results obtained in plotted form of the improved method and apparatus in determining moisture content of a sample.

The determination is based on the relationship between the original moisture content of plant tissue and loss in weight when the sample is mixed with an excess of calcium carbide. The calcium carbide reacts with water according to the following equation:

$$CaC_2 + 2H_2O = Ca(OH)_2 + C_2H_2 + 30{,}400 \text{ cal.}$$
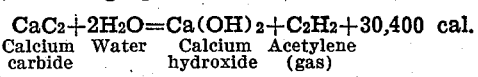

in which 36 grams of water react to give 26 grams of acetylene gas and 30,400 calories of heat. The water taking part in this reaction may be in liquid or vapor form, or in a mixture with other chemicals, such as water in plant sap.

When an excess of calcium carbide is added to a given weight of plant material and mixed, a loss of weight occurs which can be used as an index of the percentage moisture of the original sample.

A satisfactory method of carrying out this carbide reaction is found to be in a seamless tin container $a$, 3¾ inches in diameter and 2½ inches deep shown in Figure 6. Nine holes (½ inch in diameter) are drilled in the top $b$, and a coarse filter paper $c$ is glued inside the lid. The purpose of the filter paper is to prevent loss of powdered carbide due to convection currents, and at the same time allow ready escape of the acetylene gas formed. An excess of $CaC_2$ is placed in the lid and 30 grams of plant material weighed into the bottom half of the container. After obtaining the total weight (the lid with the carbide plus the container and its contents), the carbide is poured from the lid into the container. After placing the lid firmly in place, the container is alternately shaken and weighed until further loss in weight has ceased.

An examination of the graph (Fig. 5) shows the relationship found between oven determined percentages of moisture and losses in weight of mixtures of calcium carbide and thirty gram samples of plant materials. The ordinate denotes the losses in weight of thirty gram plant samples during this reaction. The percentage moisture of the original plant material, determined by measuring loss in weight caused by heating in a hot air oven at 100 C., is plotted as the abscissa. Although most of the common forage materials and small grains have been included in the determinations, all fit the same curve within 3 per cent or less of the oven determined moistures. Each point represents the average of duplicate determinations.

The question immediately arises as to whether all the water present in the plant tissues reacts to form acetylene, and if so, how contact is made between the carbide and water contained in the relatively thick stems of alfalfa or soy-bean plants. The following representative data (Table 1) show that apparently all the water present reacts when the samples contain around 40 per cent moisture or more. In the case of samples below this moisture range, the slight deviations of the points from the curve of Figure 5 show that of the water present at each moisture content, a definite portion takes part in the reaction.

TABLE 1.—*Effect of varying moisture contents of plant samples on the proportion of water reacting with carbide*

| Water (by oven method) | Water per 30 grams fresh material | Theoretical $C_2H_2$ loss | Actual loss in weight | Water reacting |
|---|---|---|---|---|
| Per cent | Grams | Grams | Grams | Per cent |
| 7.9 | 2.4 | 1.7 | 0.8 | 49.1 |
| 26.0 | 7.8 | 5.6 | 4.9 | 87.5 |
| 40.5 | 12.2 | 8.7 | 8.6 | 98.8 |
| 58.4 | 17.5 | 12.6 | 12.5 | 99.2 |
| 75.0 | 22.5 | 16.2 | 16.7 | 103.1 |
| 82.3 | 24.7 | 17.8 | 17.8 | 100.0 |

The explanation for the complete removal of water from relatively large plant stems seems to be that the reaction between surface moisture and calcium carbide generates sufficient heat to vaporize the water contained in the inner tissues, much as a hot air oven operates. The water vapor thus driven off can then react with the large excess of carbide with which the sample is mixed.

As was previously pointed out, the closeness of fit of the points to the line of the data plotted in Figure 5 indicates that this reaction may be used as an index of plant moisture from 10 per cent to 85 per cent, regardless of the type of plant tissue being analyzed.

To determine the effect of size of subdivision of sample on both the absolute value and the rate at which equilibrium is reached, determinations were made on a sample of alfalfa hay. The results, recorded in Table 2, show that no significant difference in weight loss resulted from samples cut into different lengths, but that the rate at which equilibrium was attained was affected. Although one might expect best contact between the carbide and the sample cut in the rotary blade food chopper, the matting effect on the sample of this instrument probably accounts for the poorer initial contact and slowing up of the reaction which resulted. Cutting hay samples into approximately one-half inch lengths with shears is a satisfactory procedure.

TABLE 2.—*Effect of degree of subdivision of plant sample on rate and extent of reaction with calcium carbide*

| Method of cutting sample | Length of pieces | Loss per 30 gram sample | Moisture content (by $CaC_2$) | Moisture content (by oven) | Time for equilibrium |
|---|---|---|---|---|---|
| | Inches | Grams | Per cent | Per cent | Minutes |
| Rotary chopper | ⅛ | 14.2 | 67 | 66.0 | 10 |
| Shears | ¼ | 14.1 | 66 | 66.0 | 5 |
| Do | ½ | 14.3 | 67 | 66.0 | 10 |
| Do | 1 | 14.0 | 66 | 66.0 | 20 |

It is also possible to make determinations with this method on all types of grains as long as the kernels are broken open. Whether the grains are cut lengthwise with a knife, or pounded with a hammer or other instrument, is immaterial, as long as the seed coat is broken.

That the amount of carbide used is of no importance, as long as an excess is present, is shown by the data in Table 3. As the sample used in this development work was nearly as moist as any to which this method would be applied, 100 grams of carbide is deemed sufficient. Since an excess of carbide interfered in no way with the rate or extent of the reaction, the 100 gram rate could also be used on plant samples of lower moisture content.

TABLE 3.—*Effect of amount of carbide on rate and extent of reaction with plant material*

| Carbide used per 30 grams plant sample | Weight loss per sample | Moisture content (by $CaC_2$) | Moisture content (by oven) | Difference in measurements | Time for equilibrium |
|---|---|---|---|---|---|
| Grams | Grams | Per cent | Per cent | Per cent | Minutes |
| 20 | 12.0 | 58 | 79.4 | 21.4 | 25 |
| 60 | 16.9 | 78 | 79.4 | 1.4 | 25 |
| 100 | 17.6 | 80 | 79.4 | 0.6 | 10 |
| 140 | 17.6 | 80 | 79.4 | 0.6 | 10 |

The calcium carbide may be of a technical grade, ground in a Braun planetary pulverizer. To determine the possible effect of using carbide of varying degrees of fineness, a set of determinations was made on alfalfa-timothy hay at two moisture contents—66.6 per cent and 22.6 per cent. The results, recorded in Table 4, show that as far as the final value is concerned, all sizes of carbide below 25 mesh are equally satisfactory. The fineness of grinding did, however, have an effect on the rate at which equilibrium was attained. While the technical grade of carbide gave fairly good results, it was found more satisfactory to run this material through a grinder or pulverizer. The "fine ground" calcium carbide put out by several of the chemical supply houses is also satisfactory.

TABLE 4.—*Effect of size of calcium carbide particles on the rate and extent of reaction*

| Size of carbide sample particles, meshes per inch | Loss in weight | Moisture content (by CaC₂) | Moisture content (by oven) | Difference in measurements | Time for equilibrium |
|---|---|---|---|---|---|
| | Grams | Per cent | Per cent | Per cent | Minutes |
| 10-25 | 3.1 | 18.2 | 22.6 | 4.4 | 15 |
| 25-50 | 4.0 | 21.5 | 22.6 | 1.1 | 15 |
| 50-100 | 4.5 | 23.8 | 22.6 | 1.2 | 10 |
| 100 | 4.3 | 22.8 | 22.6 | 0.2 | 10 |
| Commercial: | | | | | |
| Ground | 4.2 | 22.6 | 22.6 | 0.0 | 15 |
| Unground | 3.8 | 21.0 | 22.6 | 1.6 | 15 |
| 10-25 | 13.6 | 64.0 | 66.6 | 2.6 | 30 |
| 25-50 | 14.0 | 66.0 | 66.6 | 0.6 | 25 |
| 50-100 | | | | | |
| 100 | | | | | |
| Commercial: | | | | | |
| Ground | 14.2 | 66.4 | 66.6 | 0.2 | 20 |
| Unground | 14.0 | 66.0 | 66.6 | 0.6 | 25 |

Material with a good distribution of particle sizes gives better results than samples of uniformly large or small particle size. The cost of calcium carbide (technical grade) for a single determination is between 1 and 2 cents.

Since the time in which a determination of plant moisture can be made is an important factor in the use of such a method as the one herein described, a series of measurements was made to determine the effect of varying moisture contents on the time required to complete the reaction. The results of the work plotted in Figure 8 show that 15 minutes is sufficient time for completion of the reaction regardless of the initial moisture content of the plant material. The time required to reach equilibrium will depend somewhat, of course, upon the number of times the sample is shaken during the initial reaction period.

Although this method may be used with any size of plant sample, and on any suitable scale or balance set, it is deemed necessary, if the method is to be of greatest practical value, to provide a balance which will read directly in percentage moisture, will be sufficiently sensitive, and yet will be durable enough for field and farm use. Figures 1 to 4 and 7 show in operation a scale balance which is the outgrowth of this phase of the development.

The essential features of this balance are two arms 1, 2 (one for the pan and container, the other a counterpoise) which both point upward, and meet at an angle of approximately 150°; and a third arm 3, or ballast, which controls the extent of swing, without affecting the sensitivity through the range being considered. The arm 3 carries a scale 6. The arms pivot on a knife edge indicated at 4, made from a tool steel bolt. The arm 3 is arrested by stops at both ends of the scale which prevent excess swing and hold the balance at rest while the container and part of the carbide are being added. Deflection begins when all but about 10 grams of the carbide has been added.

In order to determine the magnitude of possible variations resulting from the use of the method and the balance, and to determine the personal error involved, several individuals were asked to make duplicate analyses of plant samples of varying moisture contents. The results of these determinations are contained in Table 5.

TABLE 5.—*Extent of variations in results, including personal error*

| Operator | Moisture content determined | Average of two determinations | Moisture content (by oven) | Difference in moisture content |
|---|---|---|---|---|
| | Per cent | Per cent | Per cent | Per cent |
| A | 72 / 77 | 74.5 | 72.1 | 2.4 |
| B | 37 / 40 | 38.5 | 39.7 | 1.2 |
| C | 30 / 32 | 31.0 | 29.6 | 1.4 |
| D | 23 / 24 | 23.5 | 22.6 | 0.9 |

*Procedure adopted*

The following are brief instructions for making a determination with this equipment:

1. Every care should be used to obtain a representative sample. Because of the simplicity and low cost, duplicate or triplicate samples may be used to check on variations due to sampling.

2. Cut the sample into approximately one-half inch lengths with a pair of shears. (For a grain sample break the seed coats by crushing or pounding.) Mix and place in a stoppered jar unless the determination is to be made immediately. Significant moisture losses will occur if the sample is left uncovered for more than 15 or 20 minutes.

3. Place the container and lid on the balance pan, and add carbide to the lid until the indicator reaches the reagent line.

4. Add plant sample to the bottom half of the container until the indicator reaches the sample line.

5. Pour carbide from the lid to the container. If the carbide is finely ground, the loss of a small amount of powder material during this operation is unavoidable, but is not of sufficient order of magnitude to influence the results. The lid is then placed on the container, and the latter shaken occasionally. Three or four periods of shaking during the course of the reaction are all that is required. When measuring a sample that is expected to run 70 per cent moisture or higher it is advisable after pouring the carbide onto the sample, to wait 5 minutes before placing the lid on the container. Then proceed as above. This allows the dissipation of excess heat which might char the sample. If the container becomes too hot to hold in the hand, it may be held with a cloth, but should be shaken less frequently than a drier sample.

6. After about 15 minutes, replace the container on the balance pan and read percentage moisture on the scale. If several determinations are being run simultaneously, samples may be allowed to stand as long as an hour before the final weighing. Duplicate determinations should be made on all samples, and for grains of from 10 per cent to 15 per cent moisture, it is advisable to run and take the average of three determinations.

7. Dispose of the contents of the container where it will not be eaten by chickens or livestocks. A bucket or paper bag makes a satisfactory receptacle. When exposed to the open air this material absorbs moisture and forms slaked lime (calcium hydroxide), which has no harmful effects on soils or crops.

This method will make available to farm operators and research workers a practical method of moisture determinations which may be readily applied to all the numerous situations in farm practice where moisture control is necessary or desirable.

It has long been recognized that hay should have a rather low moisture content to keep well in the mow. Development work has shown that hay with a moisture content of from 25 to 30 per cent can be stored safely in the ordinary mow, but that chopped hay should be drier than this to prevent browning and burning. Baled hay should also be drier than long hay put in the mow.

Small grains must be combined when at a moisture content of 14 per cent or less to prevent spoilage when stored in bins and for maximum yield, corn should not be cut or harvested until the moisture content of the grain has fallen to 40 per cent (60 per cent dry matter).

While my invention has been described with no particular reference to the moisture determination of grasses, hay, grains, etc. it will be understood that the invention is not limited to these uses. It is well known that under proper moisture conditions legumes, grasses, legume-grass and other forage mixtures may be preserved successfully in the silo. No preservatives are necessary and approximately 60 per cent to 70 per cent moisture is found to give the best results.

An apparatus and method of the type disclosed finds ready use in connection with the determination of moisture in legumes. The proper control of dry matter is probably the most important consideration in legume grass silage making, and when the moisture content is properly determined and controlled, it is seldom possible to recognize differences in silage made with or without preservation.

From the foregoing it is evident that I have disclosed a simple and inexpensive method and apparatus for the rapid determination of moisture in small grains, corn, hay and silage materials. The determination is based on the relationship between the original moisture content of plant tissue and loss in weight when the sample is mixed with an excess of carbides of calcium, barium, strontium, sodium, lithium, or potassium. A balance scale is employed and calibrated to read directly in per cent moisture, the balance operates on the lever principle but has its greatest sensitivity in the range of the last 10 per cent of the weight added, instead of decreasing its sensitivity with each increment of weight, as is the case with the simple lever balance.

The effects of several variables on moisture determinations by the improved method have also been set forth. These variables included size of cutting sample, type of plant material, amount and fineness of calcium carbide used, effect of original moisture content on the rate at which equilibrium was reached, and extent of variations in results due to the equipment and to personal error. It is possible, with the method proposed, to determine percentage moisture in plant tissue to within less than 3 per cent of the actual moisture content over a range of from less than 10 per cent to 85 per cent moisture in from 10 to 25 minutes.

While I have described my improved method and apparatus in connection with the use of calcium carbide as the preferred reagent for determining the moisture content, it will be understood that the invention is not limited to this particular reagent as any chemical, compound or mixture may be employed which reacts with the moisture of the plant tissue of the sample in such a way as to form dissipative matter which gives rise to gas and/or heat. The calcium carbide specifically mentioned herein, is perhaps one of the most inexpensive and harmless materials so that its use is particularly well suited to the average farmer.

It will be understood that I desire to comprehend within my invention such modifications as come within the scope of the claim and the invention.

Having thus fully described my invention, what I claim as new and desire to secure by Letters Patent, is:

In the art of determining the moisture content of stalky forage material in the raw state having lengths of approximately one-half inch and having a natural protective surface covering, which method consists in weighing a sample of the said material, weighing a chemical reagent capable of reacting with water and moisture in an amount largely in excess of the amount required to consume the amount of moisture estimated to be present in the material, mixing said reagent with the material sample, whereupon the moisture on the surface covering of the material will react with the reagent, allowing the mixture to stand for a sufficient time to permit the reaction between the surface covering moisture and the reagent to generate sufficient heat to penetrate the surface covering and vaporize substantially all the moisture in the interior tissues of the material sample and the inner tissue moisture as thus vaporized and forced out of the material to mix and react with the excess of the reagent, and subsequently weighing the material and any excess reagent whereby the original moisture content of the material may be determined.

ROBERT QUINN PARKS.